3,382,271
CODISTILLATION OF AROMATIC DICARBOXYLIC ACIDS
Alfred J. McNerney, Wallingford, Pa., assignor to Sun Oil Company, Philadelphia, Pa., a corporation of New Jersey
No Drawing. Filed Mar. 17, 1964, Ser. No. 352,680
6 Claims. (Cl. 260—475)

ABSTRACT OF THE DISCLOSURE

Improved process of purifying and separating aromatic carboxylic acid esters comprising providing for the presence of a small amount of the aromatic carboxylic acid in addition to a relatively high boiling chlorinated aromatic solvent and distilling the mixture at lower, more advantageous, temperatures than is possible without the acid.

Examples of the materials involved are 2,6-dimethyl naphthalene dicarboxylate, 2,6-naphthalene dicarboxylic acid and chlorinated diphenyl.

---

This invention relates to a process for purifying esters of aromatic carboxylic acids. More particularly, this invention relates to an improvement in distillation process for the recovery of aromatic carboxylic acid esters from crude reaction mixtures obtained from the oxidation and esterification of alkyl aromatics, and especially dicarboxylic acid esters obtained from dialkylnaphthalenes.

Aromatic dicarboxylic acids such as naphthalene dicarboxylic acids and their esters may be prepared by a number of methods. One such method involves oxidizing alkylnaphthalenes such as 2,6-dimethylnaphthalene with $NO_2$ in a solvent which is inert to $NO_2$ in the presence of selenium dioxide catalyst. The reaction product is generally a mixture containing not only the desired dicarboxylic acid (hereinafter referred to as "diacid"), but also small amounts of intermediate half-acids, aldehyde-acids, and unidentifiable colored materials. This mixture must then be esterified in order to obtain the corresponding dicarboxylic acid esters (hereinafter referred to as "diesters") which are useful in the preparation of various types of polymers. This is readily accomplished by removing the inert solvent, as, for example, by filtration, followed by dispersing the acid cake in an esterifying agent, such as methanol, and heating this material under known pressure and temperature conditions to obtain a mixture containing a major proportion of diesters, and a lesser amount of aldehyde-esters, half esters, unesterified diacids, and the like.

The purification and recovery of the diesters from such a reaction mixture has generally consisted of difficult but necessary distillation procedures: necessary, because it is known that certain impurities in the reaction mixture, as yet unidentified, even when present in very small amounts, inhibit the polymerization of the diesters unless they are removed; difficult, because the distillation must take place at the lowest possible temperature to prevent degradation of the ester with its resultant colored impurities which may also inhibit polymerization. Despite this need for low temperatures, however, the high boiling point of these diesters requires that the temperature of the boilers and condensers be high enough so as to avoid fouling of the condenser cooling surfaces and permit the necessary circulation during the distillation.

One of the better distillation methods which has recently been found which avoids most of these problems and yet produces satisfactory yields of substantially pure diester has been that of removing the esterification solvent, as, for example, by drying and dissolving the esterified reaction mixture in a selected high boiling point solvent in which the diester, after being distilled over, will be soluble at high temperatures yet relatively insoluble at cold temperatures, and vaporizing this solution to distill over the diester and this solvent in a more purified form. One such series of high boiling point solvents which were found to be particularly useful in this process are those chlorinated diphenyls known as "Aroclors" which have varying boiling points depending upon their degree of chlorination and which preferably have an atmospheric boiling point of over 200° C. By using these solvents it was found possible to work with lower temperatures than had heretofore been possible but without solidification or degradation of the product. This was particularly so when the distillation was carried out under vacuum. Despite this discovery, however, it was still found to be necessary to conduct the distillation at relatively high temperatures, thus causing some degradation of the diester with its resultant introduction of further impurities and loss of yield. Thus, for example, when employing this Aroclor distillation process for the purification of the dimethyl ester of 2,6-naphthalene dicarboxylic acid, the distillation had to be carried out at a temperature of about 280° C. at 70 mm. pressure.

The present invention relates to an improvement in the aforesaid distillation process wherein it has now been found that, quite surprisingly, when small amounts of the dicarboxylic acid corresponding to the diester to be purified are added to or otherwise increased in amount in the reaction mixture prior to distillation, a substantial decrease in the distillation temperature is achieved, and a more highly purified product is obtained. This added acid, which distills over with the diester—chlorinated diphenyl distillate, may then be recovered and recycled to the impure distilland, together with the separated diphenyl solvent.

The amount of diacid necessary to achieve this novel result will vary depending upon the nature of the diester and solvent chosen, as well as the temperature and pressure at which the still is to be operated. However, the diacid should be present in the distilland in amounts in excess of about 0.1% by weight based on the diester since small traces of unesterified diacid up to about 0.05% by weight are normally found in the distillate anyway but are not known to have any measurable effect on the distillation temperature. While it has been found, in accordance with the present process, that the decrease in temperature is directly proportional to the amount of acid added up to at least 12% by weight of said acid, the upper limits of added acid will necessarily be determined by commercial considerations in the handling, recovering, and recycling of the adde dacid.

Rather than adding the desired amount of diacid to the distilland prior to the distillation of the diester, it will be understood that the diacid may instead be obtained by not completely esterifying the oxidation reaction mixture and thus leaving selected amounts of diacid remaining in the reaction product. Such a practice, while generally contrary to the usual procedures wherein as much of the diester as possible is attempted to be formed, nevertheless has added benefits in that less harsh esterification conditions may be employed, along with smaller amounts of costly esterifying agents.

In carrying out this process, the chlorinated diphenyls are conveniently introduced into the distillation process by simply adding them to the esterification reaction mixture which has first been dried in order to remove any excess esterifying agent. While the desired ratio of solvent to product is not critical, it is desirable to maintain a ratio of from about 1:2 to 2:1 of solvent to product, based on the weight of these materials and preferably a ratio of about 0.6:1. The solution is then heated to the desired temperature and the temperature controlled by the slow introduction of additional solvent. The distillate vapors containing the diester, the diacid, and the diphenyl solvent are then condensed, preferably in a cooler operated at temperatures above that of saturation of the diester in the solvent, the distillate cooled until the diester and diacid are crystallized out, and the crystals are separated from the solvent. The chlorinated solvent may then be recycled to the still. The crystals may then desirably be washed with a suitable organic solvent such as hexane or pentane to remove any residual chlorinated solvent.

The removal of the diacid from the diester is readily accomplished by dissolving the crystalline product mixture in a suitable organic solvent such as toluene, benzene, or xylene and scrubbing this solution with a 5% aqueous solution of sodium bicarbonate to remove the diacid. The recovered diester may then, if necessary, be further purified with activated carbon to remove any remaining slight traces of colored impurities.

The chlorinated diphenyls which may be employed in accordance with the present process, and which are known commercially as "Aroclors," are o-, m-, or p-monochlorinated, dichlorinated or trichlorinated diphenyls, or mixtures thereof having boiling points ranging from about 272° C. to 375° C. at atmospheric pressure. Thus, the following Aroclors, which are commercially available, may satisfactorily be employed in this process:

| Aroclor No.: | Distillation range, ° C. at 760 mm. Hg |
| --- | --- |
| 1221 | 275–320 |
| 1232 | 290–325 |
| 1242 | 325–360 |

The temperature and pressure conditions employed in the distillation will naturally vary depending upon the nature of the ester being treated. However, in order to operate at the lowest possible temperatures, it is preferable that the distillation be carried out under vacuum. Thus, pressures ranging from less than 1 to more than 100 mm. of mercury may be used, and preferably from 20 to 80 mm. of mercury. Significantly, it has been found that regardless of how much the pressure is reduced, the addition of the diacid in accordance with this invention continues to have a marked effect on the lowering of the distillation temperatures. Thus, as illustrated below, at 30 mm. pressure, an ester sample containing 11.9% by weight of 2,6-naphthalene dicarboxylic acid will distill at about 220° C. while a sample containing 0.05% of the same acid distills at about 253° C.

The following examples serve to illustrate the invention, but they are not intended to limit it thereto.

EXAMPLE 1

As apparatus consisting of two one-half liter 3-neck flasks connected by a vertical column and adiabatic vapor transfer line is set up with a condenser arising from the second flask attached to a vacuum source. The vertical column and transfer line are wrapped with a heating tape, and a heat lamp is placed over the transfer line. Into the first flask, which is acting as a still, is charged 100 gms. of a crude mixture obtained by the oxidation with $NO_2$ and esterification with methanol of 2,6-dimethylnaphthalene. This crude mixture contains approximately 98% by weight of dimethyl-2,6-naphthalenedicarboxylate, trace amounts of 6-carbomethoxy-2-naphthaldehyde and 6-carbomethoxy-2-methylnaphthalene, less than 1% of other impurities, and 1.3% (1.3 gms.) of added 2,6-naphthalenedicarboxylic acid. To this mixture is added 60 gms. of Aroclor #1232, through a dripping funnel, and the solution heated to 260° C. The pressure at the outlet of the condenser is maintained at 80 mm. of mercury. The temperature in the vertical column and transfer line is maintained at 262° C. in order to avoid solidification of the product mixture in column and lines. A total of 180 gms. of additional Aroclor is introduced into the still at various intervals as the temperature starts to rise or the overhead vapors slow down. The distillate is cooled, and the resulting crystals are removed from the flask and washed with pentane to remove any excess Aroclor. The product is then dried and redissolved in toluene and washed with 100 ml. of a 5% aqueous solution of sodium bicarbonate to remove the 2,6-naphthalenedicarboxylic acid. There is obtained 95 gms. of white, crystalline dimethyl-2,6-naphthalenedicarboxylate melting at 192.0–192.5° C. The yield based on the original ester charged is 97%.

EXAMPLE 2

The procedure of Example 1 is repeated except that no additional 2,6-naphthalenedicarboxylic acid is added to the 100 gms. of crude mixture, which by assay contains 0.05% by weight of the diacid and 98.8% of the diester. Distillation takes place at 280° C. at 70 mm. of mercury. Following the recovery procedure described above, there is obtained 91 gms. of slightly yellowish crystals of dimethyl-2,6-naphthalenedicarboxylate. The yield based on the original ester charged is 92%.

EXAMPLE 3

Into the first flask of the apparatus set up as in Example 1 is charged 100 gms. of a crude mixture obtained by the oxidation with $NO_2$ followed by the partial esterification with methanol of 2,6-dimethylnaphthalene. This crude mixture contains approximately 87% by weight of dimethyl - 2,6 - naphthalenedicarboxylate, 11.9% of 2,6-naphthalenedicarboxylic acid, trace amounts of 6-carbomethoxy-2-naphthaldehyde and 6-carbomethoxy-2-methylnaphthalene, together with less than 1% of other impurities. To this mixture is added 60 gms. of Aroclor #1232, and the solution heated to 220° C. The pressure at the outlet of the condenser is maintained at 30 mm. of mercury. The temperature in the vertical column and transfer line is maintained at 223° C. in order to avoid solidification of the product mixture in column and lines. A total of 180 gms. of additional Aroclor is introduced into the still at various intervals as the temperature starts to rise or the overhead vapors slow down. The distillate is cooled, and the resulting crystals are removed from the flask and washed with pentane to remove any excess Aroclor. The product is then dried and redissolved in toluene and washed with 300 ml. of a 5% aqueous solution of sodium bicarbonate to remove the 2,6-naphthalenedicarboxylic acid. There is obtained 85 gms. of white, crystalline dimethyl-2,6-naphalenedicarboxylate melting at 192.0–193.0° C. The yield based on the original ester charged is 97.8%.

EXAMPLE 4

The procedure of Example 3 is repeated except that no 2,6-naphthalenedicarboxylic acid is present in the 100 gms. of crude mixture other than the 0.05% by weight normally found in the starting material which now contains 98.8% of the diester. Distillation takes place at 253° C. at 30 mm. of mercury. Following the recovery procedure described in Example 3 above, there is obtained 89 gms. of yellowish crystals of dimethyl-2,6-naphthalenedicarboxylate. The yield based on the original ester charged is 90%.

EXAMPLE 5

Into the first flask of the apparatus set up as in Example 1 is charged 100 gms. of a crude mixture obtained by the oxidation with $NO_2$ and esterification with methanol of 2,7-dimethylnaphthalene. This crude mixture contains approximately 99% by weight of dimethyl-2,7-naphthalenedicarboxylate, trace amounts of 7-carbomethoxy-2-naphthaldehyde and 3-carbomethoxy-2-methylnaphthalene, less than 1% of other impurities to which has been added 3.2 gms. of 2,7-naphthalenedicarboxylic acid, thus reducing the ester assay to 95.9% and the acid content to 3.1%. To this mixture is added 60 gms. of Aroclor #1232, and the solution heated to 202° C. The pressure at the outlet of the condenser is maintained at 75 mm. of mercury. The temperature in the vertical column and transfer line is maintained at 205° C. in order to avoid solidification of the product mixture in column and lines. A total of 180 gms. of additional Aroclor is introduced into the still at various intervals as the temperature starts to rise or the overhead vapors slow down. The distillate is cooled, and the resulting crystals are removed from the flask and washed with pentane to remove any excess Aroclor. The product is then dried and redissolved in toluene and washed with 200 ml. of a 5% aqueous solution of sodium bicarbonate to remove the 2,7-naphthalenedicarboxylic acid. There is obtained 95 gms. of white, crystalline dimethyl-2,6-naphthalenedicarboxylate melting at 135° C. The yield based on the original ester charged is 96%.

EXAMPLE 6

The procedure of Example 5 is repeated, starting with a crude mixture containing 99% by weight of dimethyl-1,5-naphthalenedicarboxylate, trace amounts of 8-carbomethoxy-1-naphthaldehyde and 5-carbomethoxy-1-methylnaphthalene, and less than 1% of other impurities; and 6.5 gms. of added 1,5-naphthalenedicarboxylic acid, thus reducing the ester assay to 93% and the acid content to 6.1%. Distillation takes place at 181° C. at 60 mm. of mercury. Following the recovery procedure described in Example 5 above, there is obtained 89 gms. of white, crystalline dimethyl-1,5-naphthalenedicarboxylate melting at 119° C. The yield based on the original ester charged is 97%.

I claim:

1. In the process for purifying ester of carbocyclic aromatic dicarboxylic acids wherein the ester is codistilled with a chlorinated diphenyl solvent having an atmospheric boiling point over 200° C., and the evolved vapors are condensed to recover said ester, the improvement which comprises including with said ester prior to said distillation a minor amount of the aromatic carboxylic acid which corresponds to said ester, whereby said ester and said solvent distill at a lower temperature than in the absence of said acid.

2. The process according to claim 1 wherein the ester is a dialkyl ester of a carbocyclic aromatic dicarboxylic acid.

3. The process according to claim 1 wherein the ester is dimethyl-2,6-naphthalenedicarboxylate and wherein the acid is 2,6-naphthalenedicarboxylic acid.

4. In the process for the recovery of diesters of carbocyclic aromatic dicarboxylic acids from crude mixture containing the same which are obtained from the oxidation and esterification of dialkyl aromatics, said mixtures being substantially free of the corresponding free aromatic dicarboxylic acid, wherein the crude mixture is codistilled with a chlorinated diphenyl solvent having an atmospheric boiling point over 200° C., and the evolved vapors are condensed to recover said diester from the condensate, the improvement which comprises incorporating into said crude mixture prior to said distillation at least 0.1% by weight based on the crude mixture of the aromatic dicarboxylic acid which corresponds to said diester, and distilling the mixture under reduced pressure, whereby said diester and said solvent distill at a lower temperature than in the absence of said acid.

5. The process according to claim 4 wherein the diester is dimethyl-2,6 - naphthalenedicarboxylate and wherein the dicarboxylic acid is 2,6-naphthalenedicarboxylic acid.

6. The process according to claim 5 wherein the pressure is not greater than 100 mm. of mercury.

References Cited

FOREIGN PATENTS 1,119,250  12/1961  Germany.

LORRAINE A. WEINBERGER, *Primary Examiner.*

T. GALLOWAY, *Assistant Examiner.*